Nov. 14, 1967    H. L. HOKE    3,352,579
BELL AND SPIGOT CLAMP
Filed Dec. 23, 1964    5 Sheets-Sheet 1

INVENTOR.
HOWARD L. HOKE

Nov. 14, 1967
H. L. HOKE
3,352,579
BELL AND SPIGOT CLAMP
Filed Dec. 23, 1964
5 Sheets-Sheet 2
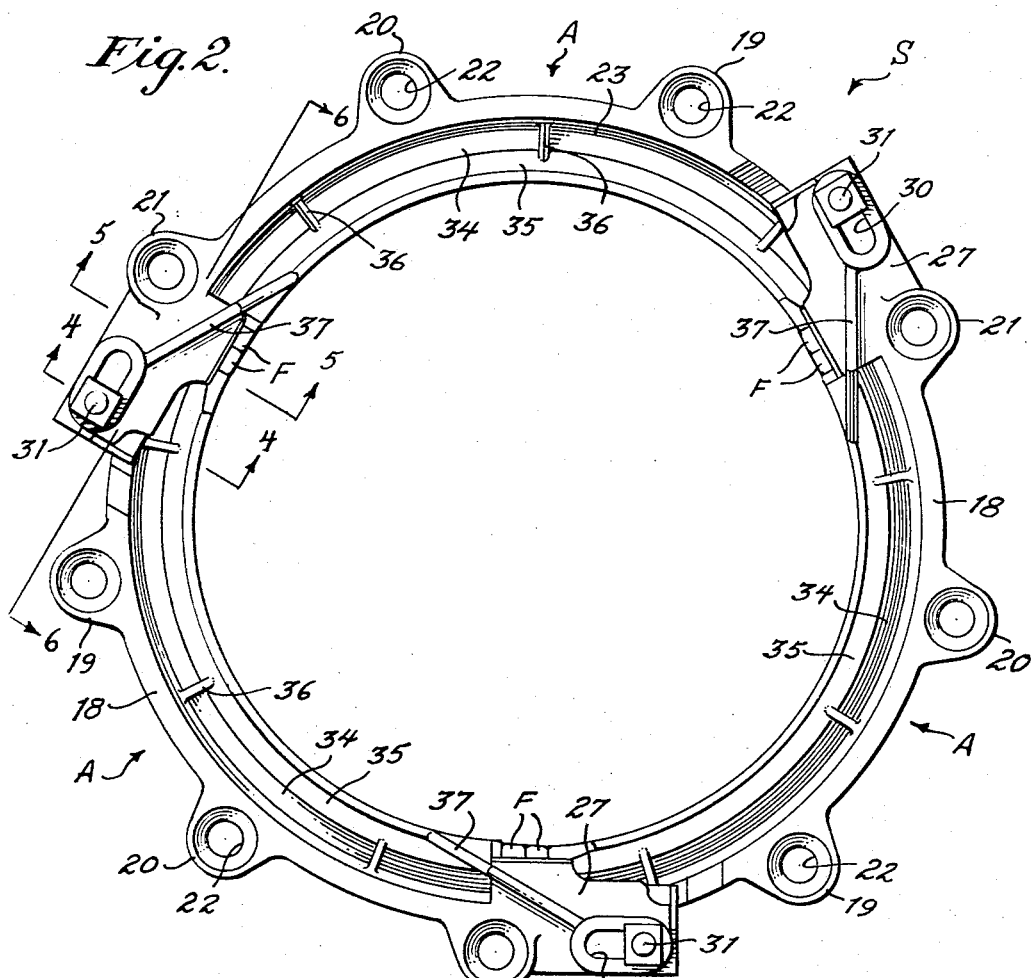
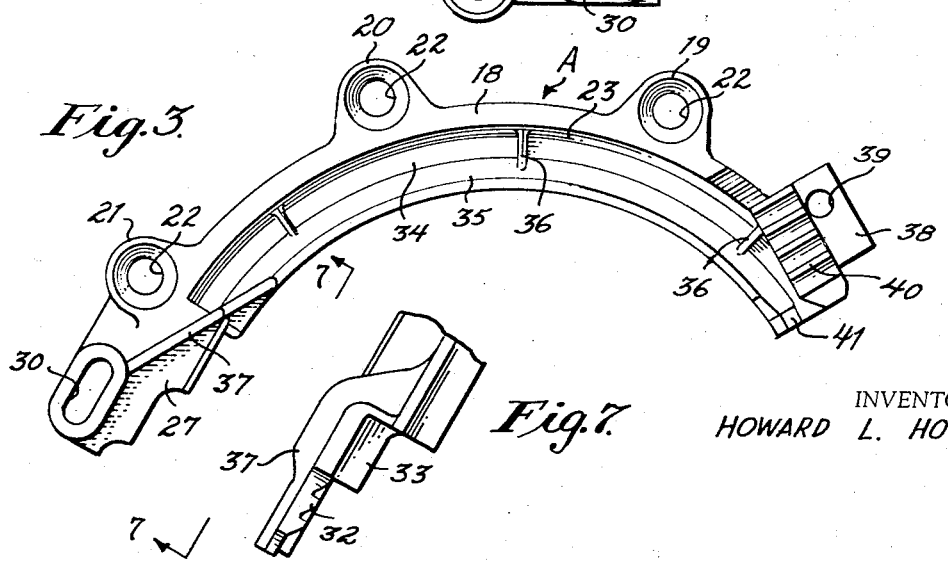
INVENTOR.
HOWARD L. HOKE Nov. 14, 1967  H. L. HOKE  3,352,579
BELL AND SPIGOT CLAMP
Filed Dec. 23, 1964  5 Sheets-Sheet 3

INVENTOR.
HOWARD L. HOKE

INVENTOR.
HOWARD L. HOKE

Nov. 14, 1967            H. L. HOKE            3,352,579
BELL AND SPIGOT CLAMP
Filed Dec. 23, 1964            5 Sheets-Sheet 5
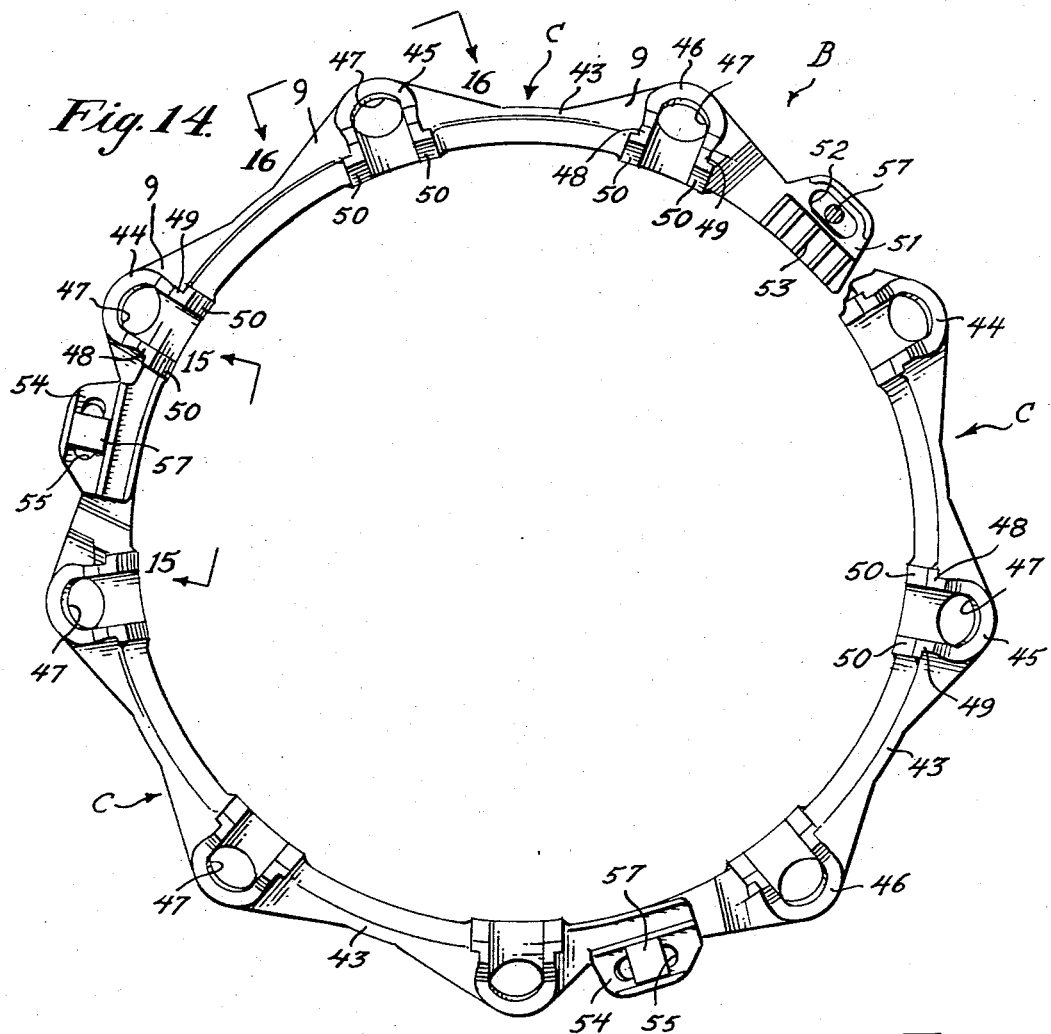
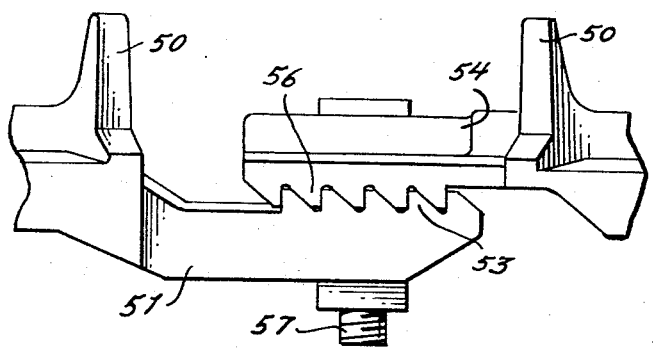
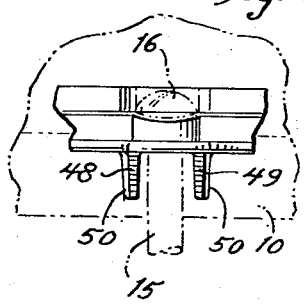
INVENTOR.
HOWARD L. HOKE United States Patent Office 3,352,579
Patented Nov. 14, 1967

3,352,579
BELL AND SPIGOT CLAMP
Howard L. Hoke, Bradford, Pa., assignor to Dresser Industries, Inc., Dallas, Tex., a corporation of Delaware
Filed Dec. 23, 1964, Ser. No. 420,540
5 Claims. (Cl. 285—337)

ABSTRACT OF THE DISCLOSURE

A clamp for use on a bell and spigot pipe to effect a leakproof seal about the joint formed between connecting pipe sections. The clamp is comprised of opposing rings for each of the bell and spigot pipe sections with a central gasket which is compressed against the pipe joint as the opposing sections are drawn together by the tightening of bolts.

---

The present invention relates to a clamp that is used in repairing bell and spigot pipe joints and is concerned primarily with certain improvements providing maximum strength with minimum weight in such a clamp.

A bell and spigot pipe joint comprises a pipe having an enlarged or bell end and a second pipe that is inserted into the bell having packing interposed between the two. A clamp of the type with which this invention is concerned comprises a bell ring which engages a shoulder on the pipe bell, a spigot ring which engages a gasket that is forced against the packing and clamping bolts which pass through openings in the two rings to draw them together and force the gasket against the packing. Both of the rings aforesaid comprise two or more arcuate parts which are joined together. These joints comprise interlocking teeth which are held in meshing relation by bolts and adjustment to size is made by varying the particular number of the teeth which interlock.

Each section of the bell ring aforesaid ordinarily comprises a generally radial body portion from the opposite ends of which extend generally axially flanges. An important object of the present invention is to provide a bell ring of this type in which the inner most axial flange aforesaid is located at the points of minimum diameter whereby the maximum resistance of any tendency of the ring to roll is provided by a minimum amount of metal.

A further object of the invention is to provide a sectional bell ring of the character aforesaid including teeth which adjust to size and in which the teeth are located as close as possible to the center and in line with what might be called the tension edge of the ring. This arrangement also provides maximum strength for any given amount of metal in the ring construction.

As mentioned above, the teeth are held in interlocking engagement by bolts. A further object of the invention is to provide a sectional bell ring of the character aforesaid with bolt holes that are located radially outwardly of the teeth and which accommodate the bolts which maintain the interlocking arrangement through the teeth is in balance with the strength of the other parts.

As pointed out above, clamping bolts are employed to draw the bell and spigot rings together. In accordance with the present invention, each bell ring section includes angularly spaced radial enlargements formed with bolt holes to accommodate these bolts. An important object of the invention is to provide a sectional bell ring of the character aforesaid in which a pair of radially extending ribs is provided for each clamping bolt hole with a rib being located on each side of the hole. The inner ends of these ribs terminate in feet which engage the pipe bell. With this arrangement, the clamping stresses are distributed over a wide range and increased resistance to corrosion is provided.

Still another object of the invention is to provide a sectional spigot ring for a clamp of the type noted in which the holes which accommodate the bolts which join the ring sections together are located radially outwardly of the teeth which interlock when the sections are joined. This means that bolts which pass through the holes do not pass through the gasket recess and there is no problem of the bolt heads partially filling the gasket recess.

Another object of the invention is to provide a sectional spigot ring for the clamp of the type indicated in which the interlocking teeth which adjust to size are arranged in line with the tension edge of the ring. Like the same arrangement which obtains in the bell ring, this provides maximum strength for a given amount of metal in the ring construction.

Like the bell ring, the spigot ring is adjusted to size by varying an arrangement of interlocking teeth. Thus, in some adjusted positions the ends of the sections are spaced apart. It has been the practice to fill these spaces with fillers but difficulty has been experienced in maintaining the fillers in proper position. An important object of the present invention is to provide a sectional spigot ring of the type noted in which one end of each section is formed with an axially extending rib and each filler is formed with a recess which receives this rib. Thus, the fillers are effectively maintained in position.

Various other more detailed objects and advantages of the invention such as arise in connection with carrying out the above noted ideas in a practical embodiment will in part become apparent and in part be hereinafter stated as a description of the invention proceeds.

The invention therefore comprises a bell and spigot pipe clamp including section bell and spigot rings which are designed to provide maximum strength for a given amount of metal in the ring constructions with novel arrangements for maintaining each ring in position after it has been adjusted to size.

For a full and more complete understanding of the invention reference may be had to the following description and accompanying drawings, wherein:

FIGURE 2 is an elevation looking at one side of an assembled spigot ring with the pipes and clamping bolts omitted.

FIGURE 3 is a detailed elevation of one spigot ring section.

FIGURE 7 is a detail taken on an enlarged scale and about on the plane represented by the line 7—7 of FIGURE 3.

FIGURE 14 is an elevation of an assembled bell ring looking at the side opposing to that depicted in FIGURE 12.

FIGURE 15 is the detail taken on an enlarged scale depicting the joint between two bell ring sections. This being taken about on the plane represented by the line 15—15 of FIGURE 14.

FIGURE 16 is another detail taken on an enlarged scale and about on the plane represented by the line 16—16 of FIGURE 14.

Figure 1:
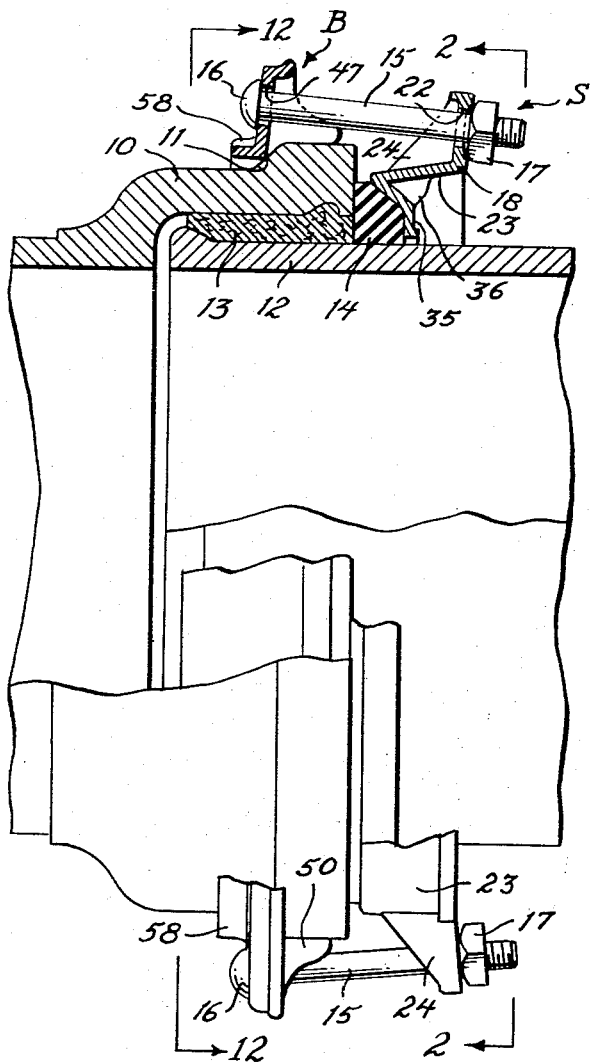
FIGURE 1 is a side view partly in section and partly in elevation of a bell and spigot joint with the repair clamp of this invention applied thereto.

Referring now to the drawings and first more particularly to FIGURE 1 a pipe bell is shown at 10 and includes a shoulder 11 which is engaged by a bell ring which is referred to in its entirety by the reference character B. The spigot end of a pipe is shown at 12 as being received in a bell 10 with the packing 13 interposed between the bell 10 and spigot 12. A gasket 14 bears against the packing 12 and is in turn engaged by a spigot ring referred to in its entirety by the reference character S. Clamping bolts shown at 15 pass through aligned holes in the two rings B and S. The bolts 15 have heads 16 which are located at the bell ring and nuts 17 which are located at the spigot ring. Obviously, the nuts 17 may be tightened to draw the rings together and thus, force the gasket 14 against the packing 13.

*The spigot ring*

The spigot ring is sectional and as shown in FIGURE 2 comprises three sections which are alike and each of which is referred to in its entirety by the reference character A. Obviously, the number of sections may vary depending on the size of any particular ring. One of the sections A is shown in detail in FIGURE 3 and includes a generally radially extending wall 18 formed with three radially outwardly extending enlargements 19, 20, and 21 each of which is formed with a bolt hole 22. It will be noted that the enlargement 21 is substantially at one end of the main body portion, section A with the enlargement 19 spaced from the other end, and enlargement 20 mid-way between the enlargements 19 and 21. Thus, the enlargements 19, 20, and 21 presenting the bolt holes are subtsantially equi-distantly spaced over the main body portion of the section A.

Extending axially inwardly of the wall 18 and towards the joint is an arcuate flange or main body portion 23 which, it will be noted, is disposed radially inwardly of the bolt holes 22. (See FIGURE 11 or FIGURE 1.)

Figure 11:
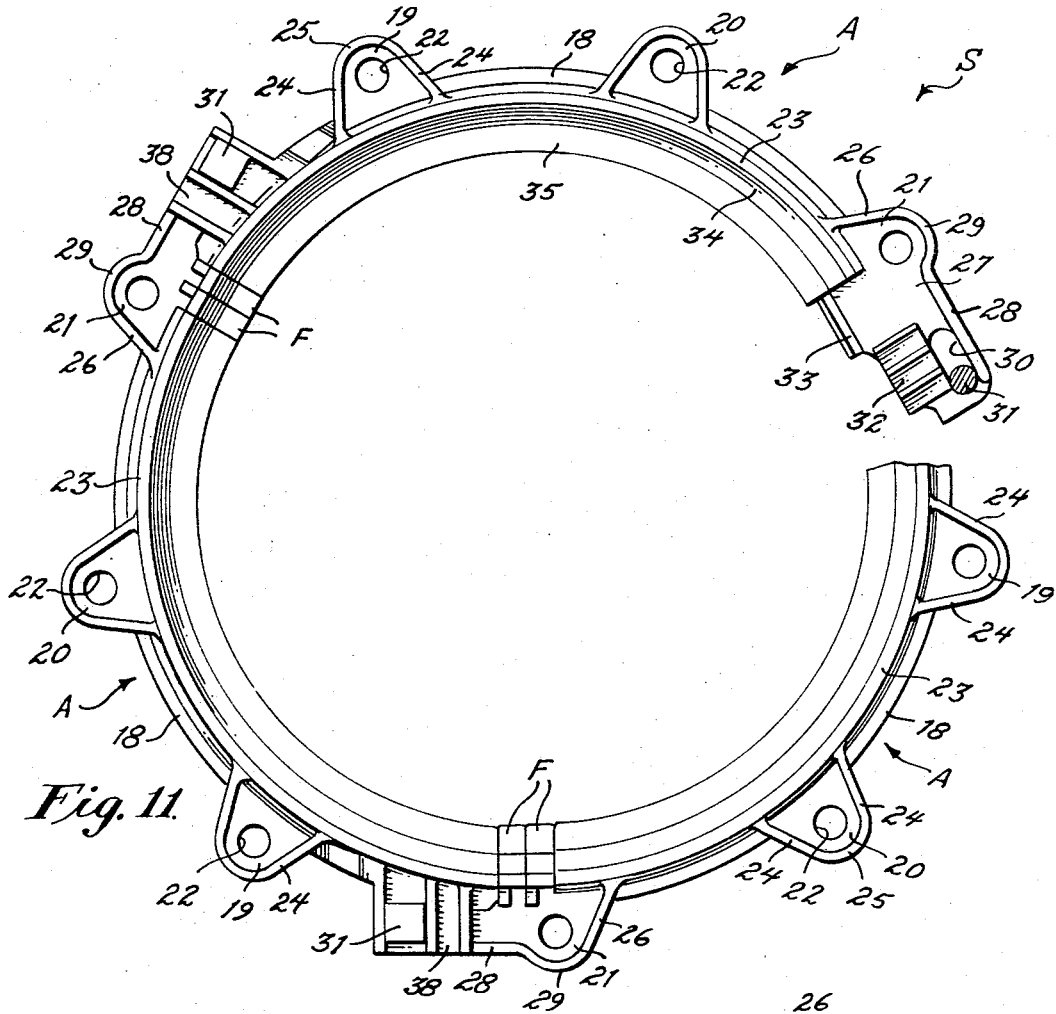
FIGURE 11 is an elevation similar to FIGURE 2 of an assembled spigot ring looking at the side opposite to that shown in FIGURE 2.
Figure 8:
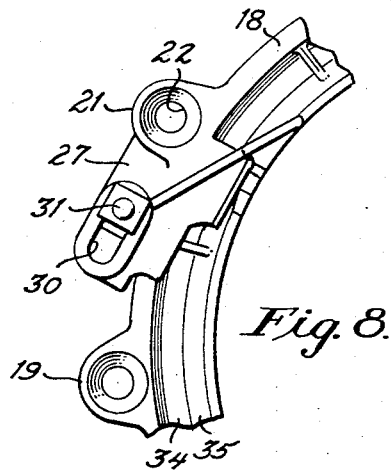
FIGURE 8 is a detail depicting the joint between the two spigot ring sections when no fillers are employed.
Figure 9:
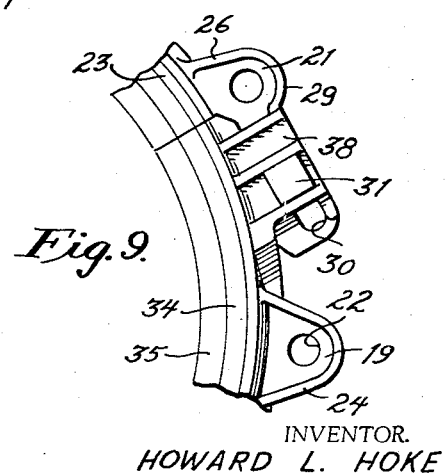
FIGURE 9 is a detail similar to FIGURE 8 illustrating the joint looking from the side opposite to FIGURE 8.
Figure 12:
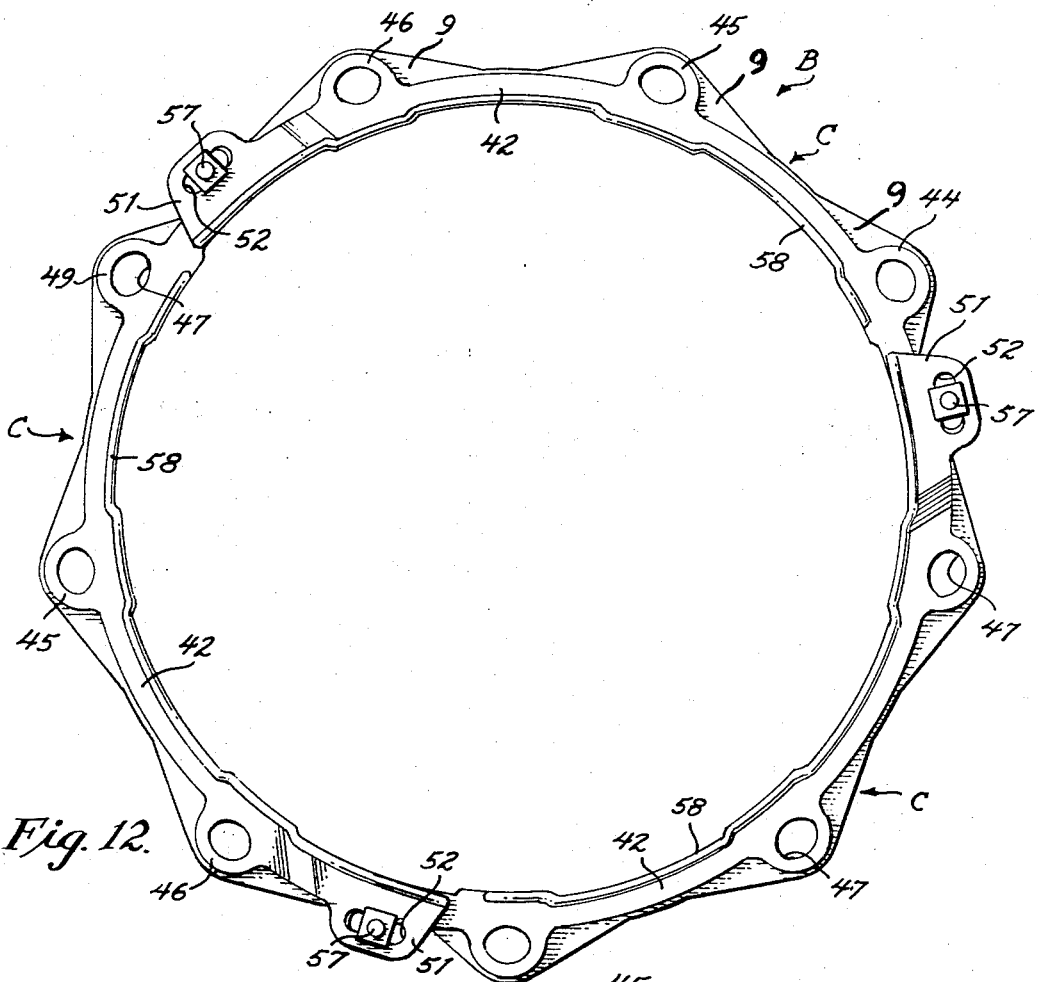
FIGURE 12 is an elevation of an assembled bell ring looking at one side and with the pipe ends and clamping bolts omitted.

Still referring to FIGURE 11, it will be noted that at each side of each enlargement 19 and 20 there are inclined reinforcing webs 24 which are integrally joined at the outer end by a bend 25. The feet of these webs are integrally formed with the flange 23 to provide reinforcement for the enlargements which are formed with the bolt holes 22. The enlargement 21 has a web 26 at only one side and continuing out from this enlargement is a plate 27 having a flange 28 on its outer edge which is joined to the web 26 by a bend 29, the entire structure being integral.

This plate 27 is formed with a slot 30 for receiving a bolt 31 which secures adjacent sections A in assembled relation. The inner face of the plate 27 is formed with a series of teeth 32, the number of which may vary depending on the amount of adjustment which is to be built into any given ring. Between the teeth 32 and the adjacent end of the flange 23 is a rib 33 that is employed to hold filler members to be later described in detail.

Integrally joined to the edge of the flange 23 opposite to the radial flange 18 is an inclined wall 34 which is in effect a section of a cone. This wall terminates at its inner edge in an inner radial flange 35.

Referring again to FIGURE 3 it will be seen that there are a plurality of reinforcing webs 36 which integrally join the flange 23 and wall 34.

The side of the plate 27 opposite to that formed with the teeth 32 has extending therefrom, a rib 37 which is continued over to the inner flange 35.

The end of each section A remote from the plate 27 is formed with an end plate 38 having a bolt hole 39 which aligns with the slot 30 of the adjacent plate and teeth 40 which cooperate with the teeth 32 of an adjacent plate.

Figure 5:
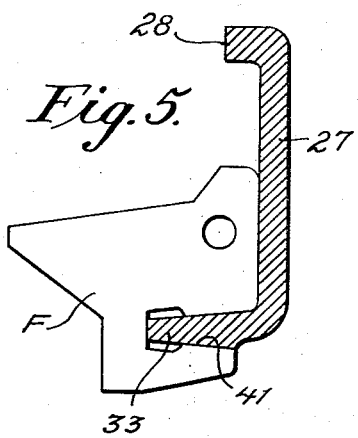
FIGURE 5 is another detail section taken on an enlarged scale and about on the plane represented by the line 5—5 of FIGURE 2.
Figure 4:
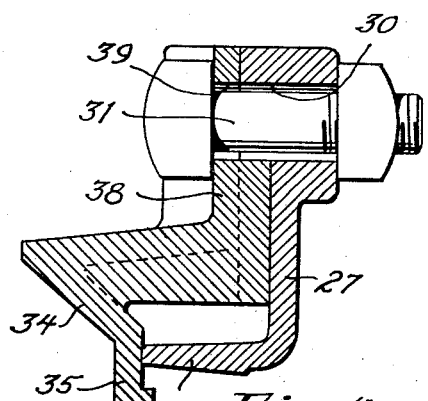
FIGURE 4 is a detailed section taken on an enlarged scale and about on the plane represented by the line 4—4 of FIGURE 2.
Figure 10:
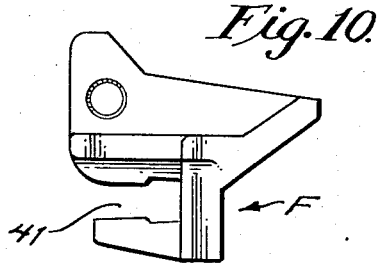
FIGURE 10 is a detailed elevation of one filler member.
Figure 6:
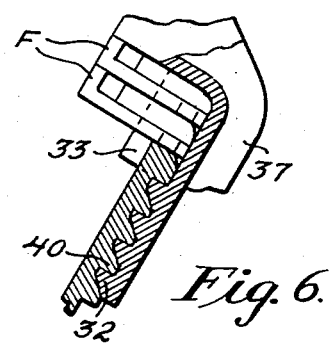
FIGURE 6 is still another detail section taken on an enlarged scale and about on the plane represented by the line 6—6 of FIGURE 2.

As explained above, when a spigot ring is to be adjusted to a larger size one or more fillers is applied. One such filler is shown in detail in FIGURE 10 and is referred to in its entirety by the reefrence character F. The filler F is formed with a recess 41 which receives the rib 33 as shown in FIGURE 5. The filler has a shape generally corresponding to the end structure of the section A immediately adjacent thereto and particularly that defined by a flange 23, inclined wall 34, and inner flange 35. It is evident that the sections A are assembled into a complete ring by having the teeth 32 on the plate 27 at one end interfit with the teeth 40 on the plate 38 of an adjacent section. A required number of fillers F are positioned with the recess 41 receiving a rib 33 and the bolts 31 pass through the aligned slots 30 and bolt holes 39. Tightening of the nuts and the bolts secures the sections in assembled relation and the fillers remain in place.

*The bell ring*

Referring now more particularly to FIGURES 12–16 inclusive, the bell ring B is shown as comprising three arcuate sections, each of which is referred to in its entirety by the reference character C. Each section C includes a central radial flange or main body portion 42. Extending in one direction from the outer end of the flange 42 is an axially extending flange 43 (FIGURE 14). With the flange 43 being interrupted at spaced points to provide enlargements 44, 45, and 46, each of which is formed with a bolt hole 47. It is the bolt holes 47 which align with the bolt holes 22 in the spigot ring and receive the clamping bolts 15. Each of the enlargements 44, 45, and 46 is reinforced by a radial web 9 of generally triangular shape with the base of each triangle integrally joined to the flange 43.

At each side of each bolt hole 47 at the respective enlargements are a pair of webs 48 and 49. One being on each side of a bolt hole. The webs 48 and 49 extend axially and their inner edges are formed with feet 50 which engage the bell 10.

At one end each section C terminates in a plate-like formation 51 formed with a bolt slot 52 and a series of teeth 53. This being shown in FIGURE 14. At the other end of the section C terminates in a plate-like structure 54 formed with a bolt slot 55 and a series of teeth 56. The teeth 53 on one section interfit with the teeth 56 of the adjacent section with the bolt slots 52 and 55 of the two sections in alignment. Bolts shown at 57 pass through the aligned bolt holes and when the nuts thereon are tightened the interfitting teeth are held in locking engagement.

Figure 13:
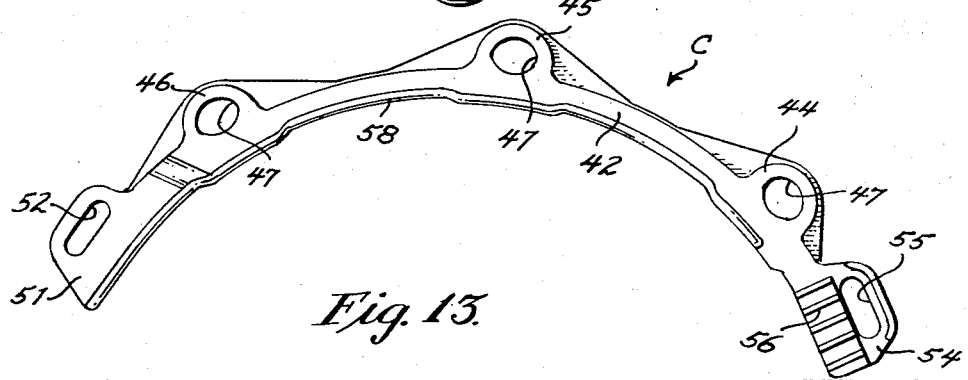
FIGURE 13 is a detailed elevation of one bell ring section.

Referring now more particularly to FIGURE 13 an inner flange 58 is shown as integrally joined to the inner end of the radial flange 42 and extends axially inwardly in a direction opposite to that in which the flange 43 extends.

While a preferred specific embodiment of the invention is hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In a bell and spigot repair clamp, a spigot ring comprising a plurality of arcuate sections each including an axially extending main body portion, an outer radial flange integral with said main body portion and formed with a plurality of spaced enlargements with each enlargement having a bolt hole for a clamping bolt, a pair of radial webs integral with said enlargement and said body portion with each web being located at one side of the bolt hole in that enlargement and the pair of webs being integrally joined at their outer ends by a bend, an inner radial flange integral with said main body portion, there being a plurality of axially and radially extending reinforcing webs integral with said main body portion and inner flange, interlocking teeth on the overlapping ends of adjacent sections located radially outward of said inner radial flange, said overlapping ends being formed with aligned bolt holes radially outwardly of said teeth to receive a bolt passing through each set of aligned bolt holes for maintaining said teeth in interlocking engagement and said sections in assembled relation.

2. In a bell and spigot repair clamp, a spigot ring comprising a plurality of arcuate sections each including an axially extending main body portion, an outer radial flange integral with said main body portion and formed with a plurality of spaced enlargements with each enlargement having a bolt hole for a clamping bolt, a pair of radial webs integral with said enlargement and said body portion with each web being located at one side of the bolt hole in that enlargement and the pair of webs being integrally joined at their outer ends by a bend, an inner radial flange integral with said main body portion, there being a plurality of axially and radially extending reinforcing webs integral with said main body portion and inner flange, interlocking teeth on the overlapping ends of adjacent sections, said overlapping ends being formed with aligned bolt holes radially outwardly of said teeth and a bolt passing through each set of aligned bolt holes for maintaining said teeth in interlocking engagement and said sections in assembled relation, each of said sections having an axial rib radially inwardly of the teeth at one end of each section, and a filler member between adjacent sections, said filler member having a recess receiving said rib whereby said filler member is held in assembled relation with respect to said arcuate sections.

3. A bell and spigot repair clamp comprising a bell ring, a spigot ring, and clamping bolts for drawing said rings together, said bell ring comprising a plurality of arcuate sections each including a radial body portion having spaced enlargements, each of which is formed with a bolt hole for a clamping bolt, a radial reinforcing web for each enlargement integral with said radial body, an outer axial flange extending in one direction and integral with said radial body and an innermost axial flange extending in a direction opposite to the first said axial flange, said last mentioned flange on the several sections defining the tension edge of said ring, interlocking teeth on adjacent sections extending outward on said radial body substantially from a line of curvature which is in arcuate continuation with said tension edge, adjacent sections being formed with aligned bolt holes radially outwardly of said tension edge to receive bolts passing through said aligned bolt holes to maintain said interlocking teeth in engagement and secure the sections in assembled relation, said spigot ring comprising a plurality of arcuate sections each including an axially extending main body portion, an outer radial flange integral with said main body portion and formed with a plurality of spaced enlargements with each enlargement having a bolt hole for a clamping bolt, a pair of radial webs integral with said enlargement and said body portion with each web being located at one side of the bolt hole in that enlargement and a pair of webs integrally joined at their outer ends by a band, an inner radial flange integral with said main body portion, there being a plurality of axially and radially extending reinforcing webs integral with said main body portion and inner flange, interlocking teeth on the overlapping ends of adjacent sections located radially outward of the inner radial flange thereof, said overlapping ends being formed with aligned bolt holes radially outwardly of said teeth and a bolt pasing through each set of aligned bolt holes for maintaining said teeth in interlocking engagement and said sections in assembled relation.

4. A bell and spigot repair clamp comprising a bell ring, a spigot ring, and clamping bolts for drawing said rings together, said bell ring comprising a plurality of arcuate sections each including a radial body portion having spaced enlargements each of which is formed with a bolt hole for a clamping bolt, a radial reinforcing web for each enlargement integral with said radial body, an outer axial flange extending in one direction and integral with said radial body and an innermost axial flange extending in a direction opposite to the first said axial flange, said last mentioned flange on the several sections defining the tension edge of said ring, a series of teeth on one side of each section at the end thereof and another series of teeth on the opposite side of said section on the opposite end thereof with the teeth on one section interlocking with the teeth of an adjacent section, each of said sections being formed with a bolt slot radially outwardly of said teeth with the bolt slot of one section aligned with the bolt slot of an adjacent section and a bolt passing through each set of aligned bolt slots for maintaining the teeth in interlocking engagement and the sections in assembled relation, said spigot ring comprising a plurality of arcuate sections each including an axially extending main body portion, an outer radial flange integral with said main body portion and formed with a plurality of spaced enlargements with each enlargement having a bolt hole for a clamping bolt, a pair of radial webs integral with said enlargement and said body portion with each web being located at one side of the bolt hole in that enlargement and the pair of webs being integrally joined at their outer ends by a bend, an inner radial flange integral with said main body portion, there being a plurality of axially and radially extending reinforcing webs integral with said main body portion and inner flange, interlocking teeth on the overlapping ends of adjacent sections, said overlapping ends being formed with aligned bolt holes radially outwardly of said teeth and a bolt passing through each set of aligned bolt holes for maintaining said teeth in interlocking engagement and said sections in assembled relation, each of said sections having an axial rib radially inwardly of the teeth at one end of each section, and a filler member between adjacent sections, said filler member having a recess receiving said rib whereby said filler member is held in assembled relation with respect to said arcuate sections.

5. In a bell and spigot repair clamp, a spigot ring comprising a plurality of arcuate sections each including an axially extending main body portion, an outer radial flange integral with said main body portion and formed with a plurality of spaced enlargements with each enlargement having a bolt hole for a clamping bolt, an inner radial flange integral with said main body portion, and coperating therewith to provide a gasket recess, there being a plurality of axially and radially extending reinforcing webs integral with said main body portion and inner flange, interlocking teeth on the overlapping ends of adjacent sections located radially outward of said inner radial flange, said overlapping ends being formed with aligned bolt holes radially outwardly of said teeth and said gasket recess to receive a bolt passing through each set of aligned bolt holes for maintaining said teeth in interlock engagement and said sections in assembled relation.

References Cited
UNITED STATES PATENTS

| | | | |
|---|---|---|---|
| 2,220,986 | 11/1940 | Bartell | 285—337 X |
| 2,248,000 | 7/1941 | Johnson | 285—337 X |
| 2,679,410 | 5/1954 | Boughton | 285—337 X |
| 2,822,195 | 2/1958 | Hoke | 285—337 |
| 2,842,383 | 7/1958 | Merrill | 285—337 X |
| 2,969,995 | 1/1961 | Boughton | 285—413 |

EDWARD C. ALLEN, *Primary Examiner.*

CARL W. TOMLIN, *Examiner.*

R. G. BERKLEY, *Assistant Examiner.*